(12) United States Patent
Xu et al.

(10) Patent No.: US 11,635,630 B2
(45) Date of Patent: Apr. 25, 2023

(54) CAMERA LENS MODULE

(71) Applicant: AAC Optics Solutions Pte. Ltd., Singapore (SG)

(72) Inventors: Tongming Xu, Shenzhen (CN); Houwei Zhao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 322 days.

(21) Appl. No.: 17/017,750

(22) Filed: Sep. 11, 2020

(65) Prior Publication Data

US 2020/0409171 A1 Dec. 31, 2020

Related U.S. Application Data

(63) Continuation of application No. PCT/CN2019/089717, filed on Jun. 1, 2019.

(51) Int. Cl.
| | |
|---|---|
| G02B 27/64 | (2006.01) |
| G03B 3/10 | (2021.01) |
| H02K 41/035 | (2006.01) |
| G02B 7/08 | (2021.01) |
| G02B 7/09 | (2021.01) |
| G03B 13/36 | (2021.01) |

(52) U.S. Cl.
CPC ............ *G02B 27/646* (2013.01); *G02B 7/08* (2013.01); *G02B 7/09* (2013.01); *G03B 3/10* (2013.01); *G03B 13/36* (2013.01); *H02K 41/0356* (2013.01)

(58) Field of Classification Search
CPC .......... G02B 27/646; G02B 7/08; G02B 7/09; G03B 3/10; G03B 13/36; G03B 2205/0069; G03B 5/02; G03B 30/00; G03B 5/00; H02K 41/0356
See application file for complete search history.

(56) References Cited

U.S. PATENT DOCUMENTS

| | | | |
|---|---|---|---|
| 2015/0256727 A1* | 9/2015 | Kim .................... | G02B 7/006 348/208.12 |
| 2016/0299349 A1* | 10/2016 | Cho ...................... | G03B 3/10 |
| 2019/0377155 A1* | 12/2019 | Bachar ................. | H04N 5/2254 |

* cited by examiner

*Primary Examiner* — Cara E Rakowski
(74) *Attorney, Agent, or Firm* — W&G Law Group

(57) ABSTRACT

The invention provides a camera lens module, which include a housing, a first bracket, a lens assembly, a focus driving assembly and a stabilization detection mechanism. The stabilization detection mechanism is provided on the lens assembly and the housing for driving the lens assembly to move in a direction perpendicular to the optical axis direction of the lens assembly. The focus driving assembly of the present invention drives the first bracket to drive the lens assembly to move along the optical axis of the lens assembly to realize its automatic focus adjustment. The stabilization detection mechanism drives the lens assembly to move in the direction perpendicular to the optical axis of the lens assembly to achieve its anti-shake compensation.

9 Claims, 17 Drawing Sheets

A-A

CAMERA LENS MODULE

FIELD OF THE PRESENT DISCLOSURE

The present invention relates to the field of optical imaging technology and in particularly related to a camera lens module used in mobile electronic devices such as mobile phones.

DESCRIPTION OF RELATED ART

In recent years, with the development of imaging technology and the rise of electronic products with imaging functions, optical lenses have been widely used in various electronic products. Generally, light is directly incident from the object side, along the optical axis through the lens assembly to the image side and the lens assembly is used to image the object. In the related art, the lens assembly has an autofocus function. During shooting, the focus driving assembly can drive the lens assembly to move along the optical axis relative to the bracket to take a clear image. However, in the case of jittery shooting, the lens assembly will move slightly in the plane perpendicular to the optical axis, which seriously affects the sharpness of the image.

Therefore, it is necessary to provide a camera lens module to solve the problem of poor sharpness of the image captured by the existing lens assembly under jittery condition.

SUMMARY OF THE INVENTION

One of the objects of the invention is to provide a camera lens module with anti-shake compensation function.

Accordingly, the invention provides a camera lens module comprising: a housing; a first bracket installed in the housing so as to be movable relative to the housing along an optical axis of the camera lens module; a lens assembly mounted inside the first bracket in such a manner that the lens assembly is movable relative to the first bracket along the optical axis direction and is immovable relative to the first bracket along the optical axis; a focus driving assembly provided on the housing and the first bracket for driving the first bracket to drive the lens assembly to move along the optical axis of the lens assembly; a stabilization detection mechanism coupled with the lens assembly and the housing for driving the lens assembly to move in a direction perpendicular to the optical axis; a first guide slip structure for guiding the movement of the first bracket along the optical axis provided between the housing and the first bracket; a second guide slip structure for guiding the lens assembly to move in a direction perpendicular to the optical axis provided between the housing and the lens assembly; and a first avoidance opening for avoiding the stability detection mechanism provided on the first bracket.

Further, the focus driving assembly includes a first magnet provided in one side of the first bracket and one side of the housing and a first driving coil; the first driving coil is provided on the other side of the first bracket and the other side of the housing; the first driving coil is disposed opposite to the first magnet for driving the first bracket and the lens assembly to move along the optical axis in cooperation with the first magnet.

Further, the camera lens module comprises a first pole plate disposed on a side of the first driving coil away from the first magnet; the first pole plate is arranged opposite to the first magnet for attracting the first magnet to support the first bracket and the lens assembly.

Further, the first guide slip structure includes a plurality of first balls between a side of the housing and a first side part of the bracket, a plurality of first slip grooves in the side part of the housing and a plurality of second slip grooves in the first side part of bracket; the first slip groove and the second slip groove enclose for forming a first accommodation space for the first ball for providing movement guidance.

Further, the stabilization detection mechanism includes a second magnet on a top part of the lens assembly and a top part of the housing, and a second driving coil provided on another top part of the lens assembly and the top part of the housing; the second driving coil and the second magnet are spaced opposite apart for driving the lens assembly to move in the optical axis direction perpendicular to the lens assembly in cooperation with the second magnet.

Further, the camera lens module comprises a second pole plate disposed on the second driving coil on a side thereof away from the second magnet; the second pole plate and the second magnet are arranged opposite to each other at intervals for attracting the second magnet to support the lens assembly; and the second driving coil is provided between the second pole plate and the second magnet.

Further, the second guide slip structure includes a plurality of second balls provided between the top part of the lens assembly and the first bracket, a third slip groove provided on the top part of lens assembly and a plurality of fourth slip grooves provided on the first bracket; the third slip groove and the fourth slip groove are enclosed to form the second accommodation space for receiving the second balls for providing movement guidance.

Further, the camera lens module comprises a circuit board provided on the housing; the circuit board has a vertical plate vertically extending from one side of the housing and connected to the first drive coil, a lateral plate laterally extending from the top end of the vertical plate to the top part of the housing and connected to the second drive coil, and a extension plate laterally extending outside the housing from the bottom end of the vertical plate; or/and:

the first bracket includes a top plate, a side plate extending vertically downward from one side of the top plate and used for fixing the first magnet and a end plate respectively connected to the top plate and the side plate on both sides; the fourth slip groove and the first avoidance opening are provided on the top plate; the first slip groove is provided on an outer portion of the side plate, while the end plate is provided with a through hole for avoiding light entering the lens assembly.

Further, the housing includes a second bracket, a first covering plate and a second covering plate; the first bracket, the lens assembly, the focus driving assembly and the stability detection mechanisms are all located in the second bracket; the first covering plate and the second covering plate are wrapped on outside of the second bracket from the top part and the bottom part of the second bracket respectively.

Further, the second bracket includes an inner cavity for accommodating the first bracket and the lens assembly, an exposed light penetration hole connecting with the inner cavity, a through hole connecting with the inner cavity and located on the second side part of bracket for the focus driving assembly to pass through, and a second avoidance opening connecting with the inner cavity and located in top part of bracket for avoiding the stabilization detection mechanism.

BRIEF DESCRIPTION OF THE DRAWINGS

Many aspects of the exemplary embodiments can be better understood with reference to the following drawings.

DETAILED DESCRIPTION OF THE EXEMPLARY EMBODIMENTS

Figure 1:
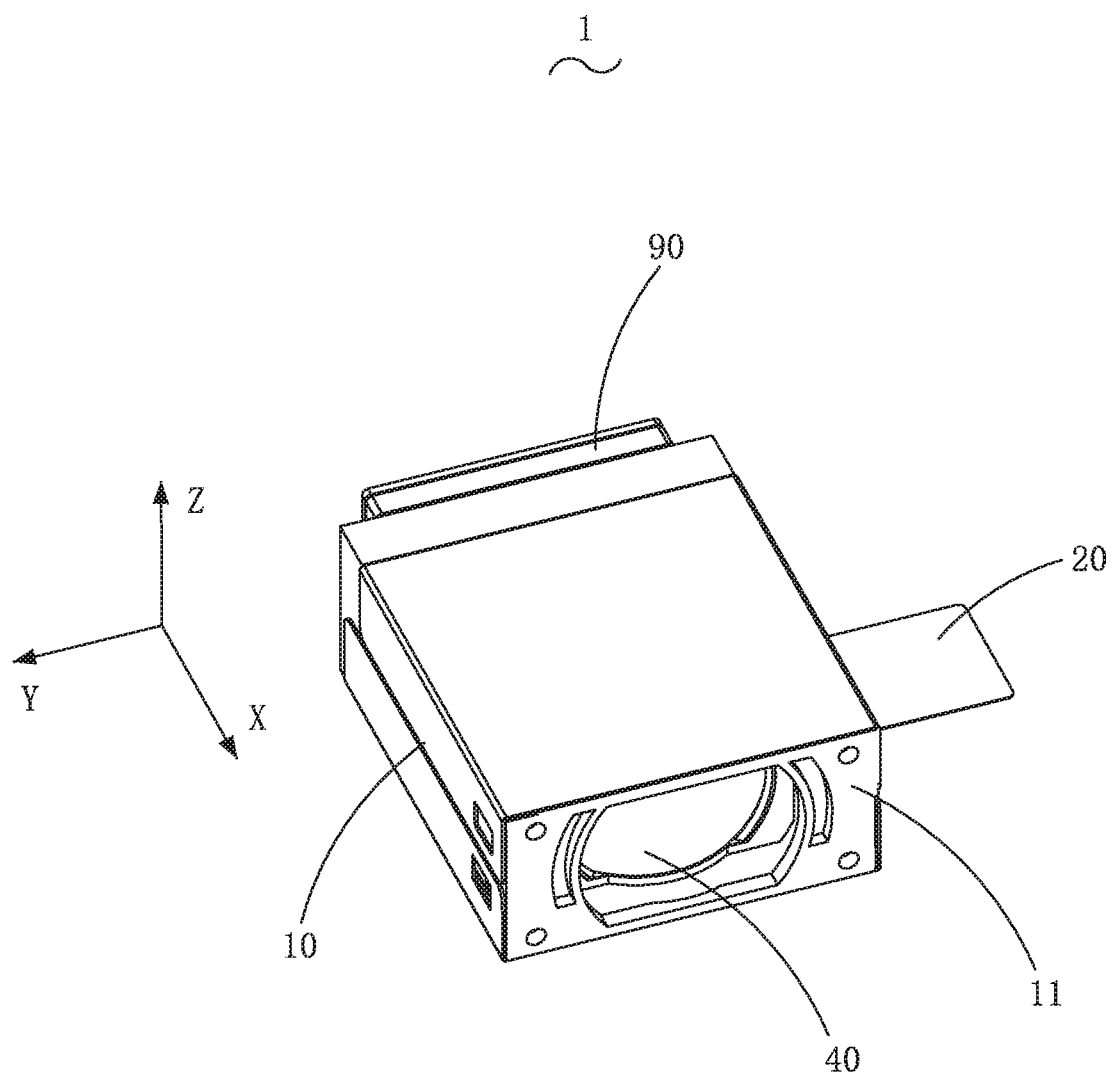
FIG. 1 is an isometric view of a camera lens module provided by an embodiment of the present invention.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

It should be noted that all directional indications (such as up, down, inner, outer, top part, bottom part . . . ) in the embodiment of the utility model are only used to explain the relative positional relationship between components under a specific posture (as shown in the drawings). If the specific posture changes, the directional indication changes accordingly.

It should also be noted that when an element is referred to as being "fixed" or "disposed" on another element. The element can be directly on the other element or there can be a centering element at the same time. When an element is said to "connect" another element, it may be directly connected to the other element or there may be a center element at the same time.

Please refer to FIGS. 1-17. The embodiment of the present invention provides a camera lens module 1. The camera lens module 1 includes a housing 10, a circuit board 20, a first bracket 30, a lens assembly 40, a focus driving assembly 50, a stability detection mechanism 60, a first guide slip structure 70 and a second guide slip structure 80. The circuit board 20 is installed on the housing 10, and the first bracket 30 is installed in the housing 10 in a manner movable relative to the housing 10 along the optical axis of the lens assembly 40. Both the focus driving assembly 50 and the stabilization detection mechanism 60 are electrically connected to the circuit board 20, and the lens assembly 40 is relatively first The bracket 30 is movable in the optical axis direction of the vertical lens assembly 40 and the lens assembly 40 is installed in the first bracket 30 relative to the first bracket 30 in a non-movable manner along the optical axis direction of the lens assembly 40.

The focus driving assembly 50 is provided on the housing 10 and the first bracket 30 to drive the first bracket 30 to drive the lens assembly 40 to move along the optical axis of the lens assembly 40 (the direction indicated by the X axis in FIG. 1), that is, to move along the length of the housing 10 to realize the auto focus of lens assembly 40 in the housing 10. The stabilization detection mechanism 60 is provided on the lens assembly 40 and the housing 10 to drive the lens assembly 40 to move in a direction perpendicular to the optical axis of the lens assembly 40 (the direction indicated by the Y axis in FIG. 1), that is, to move along the width direction of the housing 10 to achieve anti-shake compensation of the lens assembly 40 within the housing 10.

In specific application, the first guide slip structure 70 is provided between the housing 10 and the first bracket 30. The first guide slip structure 70 is used to guide the movement of the first bracket 30 along the optical axis of the lens assembly 40. The second guide slip structure 80 is provided between the housing 10 and the lens assembly 40. The second guide slip structure 80 is used to guide the lens assembly 40 to move in a direction perpendicular to the optical axis of the lens assembly 40. In the case of shooting with jitter, the lens assembly 40 may move slightly in a plane perpendicular to the optical axis. At this time, the stabilization detection mechanism 60 drives the lens assembly 40 to do the opposite displacement in cooperation with the second guide slip structure 80 to compensate for the amount of jitter. In order to obtain high-definition images, the first bracket 30 is provided with a first avoidance opening 311 for avoiding the stabilization detection mechanism 60, so that the stabilization detection mechanism 60 can directly drive the lens assembly 40 to move within the first bracket 30.

Figure 3:
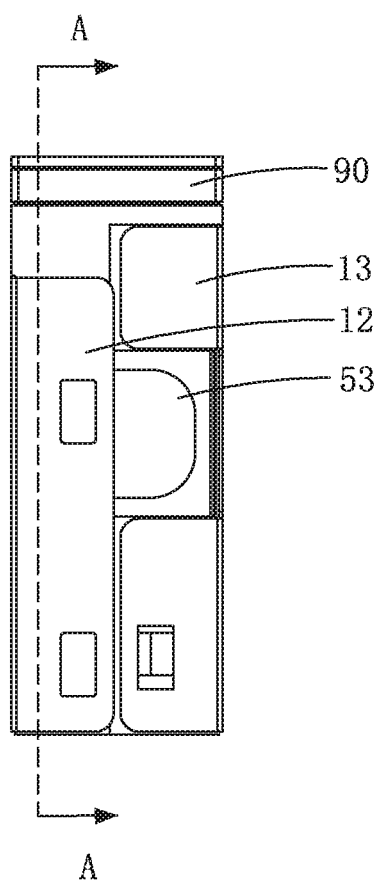
FIG. 3 is a side view of the camera lens module of the embodiment of the present invention.
Figure 4:
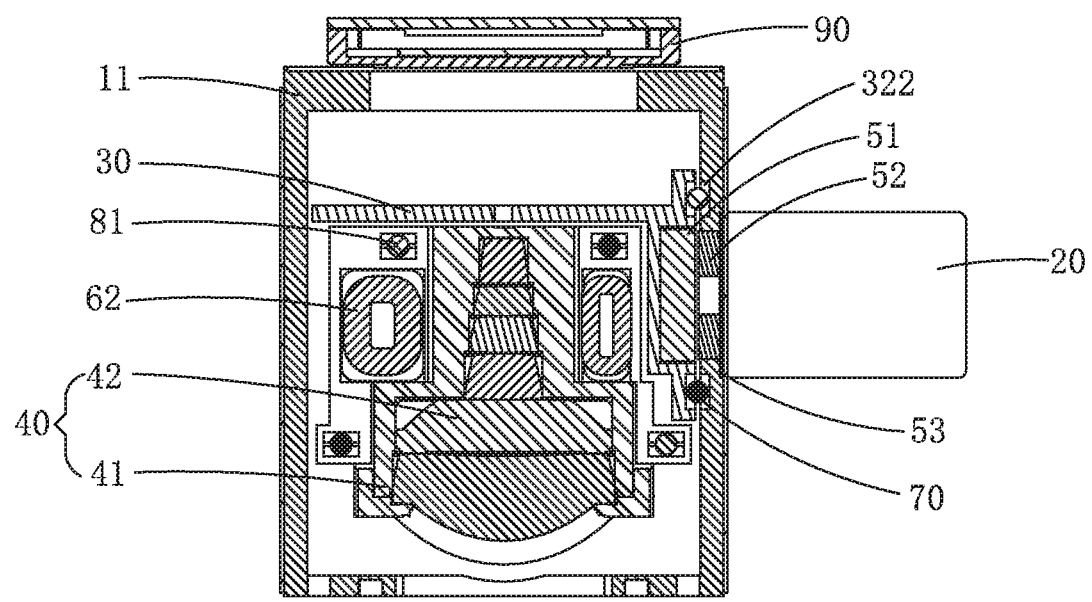
FIG. 4 is a cross-sectional view of the camera lens module taken along line A-A in FIG. 3.

As shown in FIG. 3 and FIG. 4, the focus driving assembly 50 includes a first magnet 51, a first driving coil 52 and a first pole plate 53. The positions of the first magnet 51 and the first driving coil 52 can be interchanged, that is, the first magnet 51 is located on the first bracket 30. On the outer side wall, the first driving coil 52 is provided on the side part of housing 10 through the circuit board 20 and is opposite to the first magnet 51, or the first driving coil 52 is provided on the outer side wall of the first bracket 30. The first magnet 51 is provided on the side part of housing 10 and is arranged opposite to the first driving coil 52 at intervals.

Preferably, in this embodiment, the first magnet 51 is located on the outer side wall of the first bracket 30. The first driving coil 52 is located on the side part of housing 10, and the first driving coil 52 is electrically connected to the circuit board 20 to generate a magnetic field force. The first driving coil 52 is used to cooperate with the first magnet 51 to drive the first bracket 30 to drive the lens assembly 40 to move along the optical axis of the lens assembly 40. The first pole plate 53 is fixed to the side part of the housing 10 and is arranged opposite to the first magnet 51. The first pole plate 53 is set at the first. The driving coil 52 is away from the first magnet 51. Optionally, the first pole plate 53 is located between the first driving coil 52 and the circuit board 20 or the first pole plate 53 is located on the side of the circuit board 20 away from the first driving coil 52. A pole plate 53 is used to attract the first magnet 51 to support the first bracket 30 and the lens assembly 40. Specifically, the first pole plate 53 is disposed on the side of the circuit board 20 away from the first driving coil 52.

The first guide slip structure 70 includes a plurality of first ball 71 disposed between the housing 10 and the first bracket 30. A plurality of first slip grooves 111 disposed on the housing 10 and a plurality of second slip grooves 321 disposed on the first bracket 30. The first slip groove 111 and the second slip groove 321 are enclosed to form a first accommodation space 322 for receiving the first ball 71 for performing movement guidance. A height of the first ball 71 is greater than a sum of the heights of the first slip groove 111 and the second slip groove 321. In this embodiment, the number of the first ball 71 is four, which are respectively arranged around the first magnet 51. Of course, in a specific application, the number and distribution of the first ball 71 may not be limited to what has been described.

Figure 5:
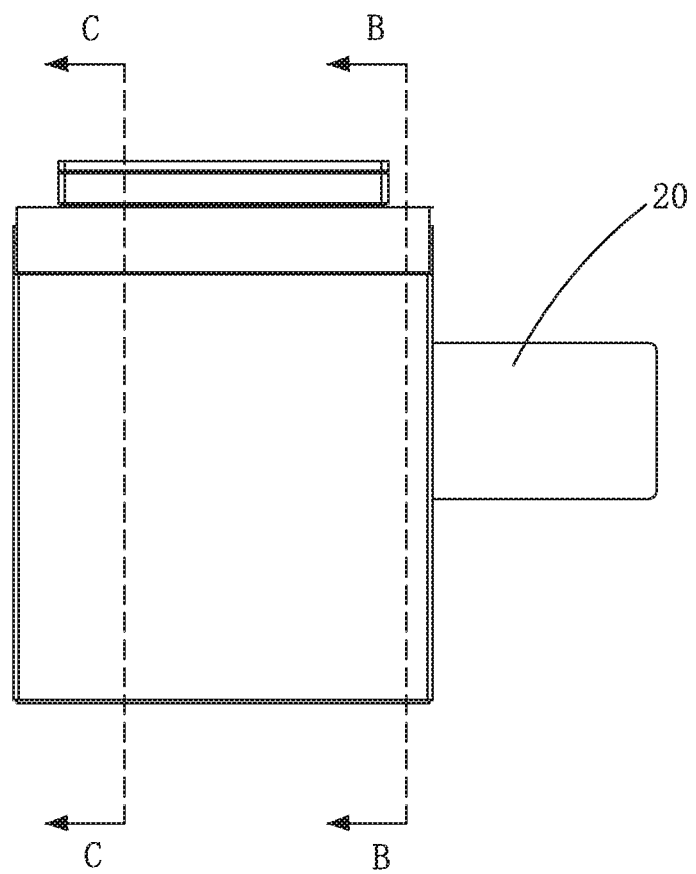
FIG. 5 is a top view of the camera lens module.
Figure 6:
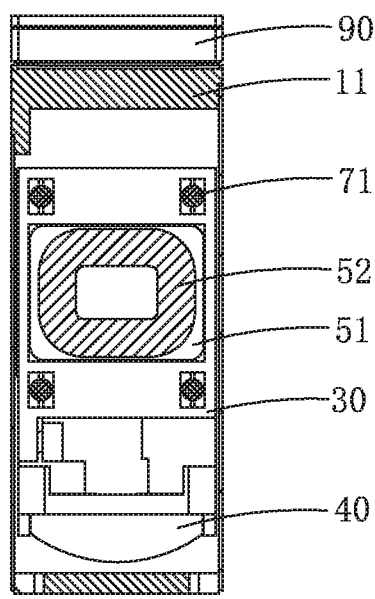
FIG. 6 is a cross-sectional view of the camera lens module taken along line B-B in FIG. 5.
Figure 7:
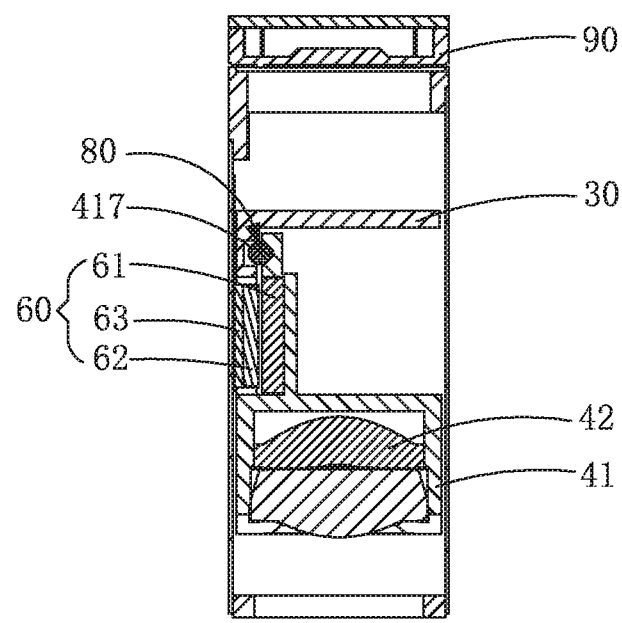
FIG. 7 is a cross-sectional view of the camera lens module taken along line C-C in FIG. 5.

As shown in FIGS. 5-7, the stability detection mechanism 60 includes a second magnet 61, a second driving coil 62, and a second pole plate 63. The positions of the second magnet 61 and the second driving coil 62 can be interchanged, that is, the second magnet 61 is located at the top of the lens assembly 40 part. The second driving coil 62 is located at the top part of housing 10 and is spaced apart from the second magnet 61. The second driving coil 62 is located at the top part of lens assembly 40. The second magnet 61 is located at the top part of housing 10 and is connected to the second driving coil 62. The interval is relatively set.

Preferably, in this embodiment, the second magnet 61 is located at the top part of lens assembly 40. The second driving coil 62 is located at the top part of housing 10, the second driving coil 62 is electrically connected to circuit board 20 to generate a magnetic field force. The second driving coil 62 is used to the second magnet 61 cooperates with the driving lens assembly 40 to move along the optical axis of the vertical lens assembly 40. The second pole plate 63 is fixed to the top part of housing 10 and is arranged opposite to the second magnet 61. The second pole plate 63 is provided on the second driving coil 62 away from the second on the side of the magnet 61. Optionally, the second pole plate 63 is provided between the second driving coil 62 and the circuit board 20 or the second pole plate 63 is provided on the side of the circuit board 20 away from the second driving coil 62. The second pole plate 63 is used for adsorption. The second magnet 61 supports the lens assembly 40. Specifically, the second pole plate 63 is disposed between the second driving coil 62 and the circuit board 20.

In this embodiment, the circuit board 20 has a vertical plate 21, a lateral plate 22, and an extension plate 23. The vertical plate 21 extends vertically from one side of the housing 10 and is connected to the first driving coil 52. The lateral plate 22 extends laterally from the top end of the vertical plate 21 to the top part of the housing 10. The second driving coil 62 is connected. The extension plate 23 extends laterally from the bottom end of the vertical plate 21 outside the housing 10 to connect with an external power source to supply current to the first driving coil 52 and the second driving coil 62.

The second guide slip structure 80 includes a plurality of second ball 81 disposed between a top part of the lens assembly 40 and the first bracket 30. A plurality of third slip grooves 413 is disposed on top of the lens assembly 40 and a plurality of fourth slip grooves 312 disposed on the first bracket 30. The third slip groove 413 and the fourth slip groove 312 are enclosed to form a second accommodation space 417 for receiving the second ball 81 for providing movement guidance. A height of the second ball 81 is greater than the sum of the heights of the third slip groove 413 and the fourth slip groove 312. In this embodiment, the number of the second ball 81 is four. The four second balls 81 are all set in the respective second accommodation space 417. In specific applications, the number and distribution of the second ball 81 may not be limited to this.

As shown in FIG. 2, FIGS. 10-16, the first slip groove 111 has a first bottom surface of groove 116, a first groove opening 117 disposed opposite to the first bottom surface of groove 116 and two first side wall 118 connected to the first bottom surface between groove 116 and the first groove opening 117 shown and spaced apart in the height direction of housing 10 (the direction indicated by the Z axis in FIG. 1). The second slip groove 321 has a second bottom surface of groove 324. The second bottom surface of groove 324 is spaced apart from the second groove opening 325 and two second side walls 326 spaced from each other in the height direction of housing 10 (the direction indicated by the Z axis in FIG. 1).

In this embodiment, two first side walls 118 are vertical planes extending from the first groove opening 117 to the first bottom surface of groove 116 at equal intervals. Two second side walls 326 are spaced from the second groove opening 325 to the second bottom surface of groove 324. The gradually decreasing trend extends the inclined surface. The first ball can only move along the optical axis of the lens assembly in the slip groove so that the cooperation between the first slip groove 111 and the second slip groove 321 can define the first bracket 30 in the height direction of housing 10 It does not move relative to housing 10 (the direction indicated by the Z axis in FIG. 1). Of course, in a specific application, as an alternative embodiment, the two first side walls 118 and the two second side walls 326 can also be set to extend from the groove opening to the bottom surface of groove with a gradually decreasing pitch. Inclined surface; or, two first side walls 118 are set as inclined surfaces extending from the first groove opening 117 to the first bottom surface of groove 116 with a gradually decreasing pitch, and the two second side walls 326 are set from the second groove opening 325. A vertical plane extending to the second bottom surface of groove 324 at equal intervals.

The third slip groove 413 has a third bottom surface of groove 414, a third groove opening 415 disposed opposite to the third bottom surface of groove 414 and two connected between the third bottom surface of groove 414 and the third groove opening 415 and between the lens assembly. The third side wall 416 is oppositely arranged in the optical axis direction. The fourth slip groove 312 has a fourth bottom surface of groove 313. A fourth groove opening 314 is arranged opposite to the fourth bottom surface of groove 313. Two optical axis direction intervals in the lens assembly are relatively set opposite to the fourth side wall 315. In this embodiment, two of the third side walls 416 are inclined surfaces extending from the third groove opening 415 to the third bottom surface of groove 414 with a gradually decreasing spacing. Two of the fourth side walls 315 are vertical planes extending from the fourth groove opening 314 to the fourth bottom surface of groove 313 with equal spacing.

The second ball can only move in the vertical direction of the optical axis of the lens assembly in the slip groove. In this way, the cooperation between the third slip groove 413 and the fourth slip groove 312 can be defined. The lens assembly 40 does not move relative to the first bracket 30 in the optical axis direction. Of course, in specific applications, as an alternative embodiment, the two third side walls 416 and the two fourth side walls 315 can also be set to extend from the groove opening to the bottom surface of groove in a trend of gradually decreasing pitch. Bevel; or, the two third side walls 416 are set as vertical planes extending at equal intervals from the third groove opening 415 to the third bottom surface of groove 414, and the two fourth side walls 315 are set from the fourth groove opening 314 to the first The four bottom surfaces of grooves 313 are inclined surfaces extending with a decreasing pitch.

Figure 2:
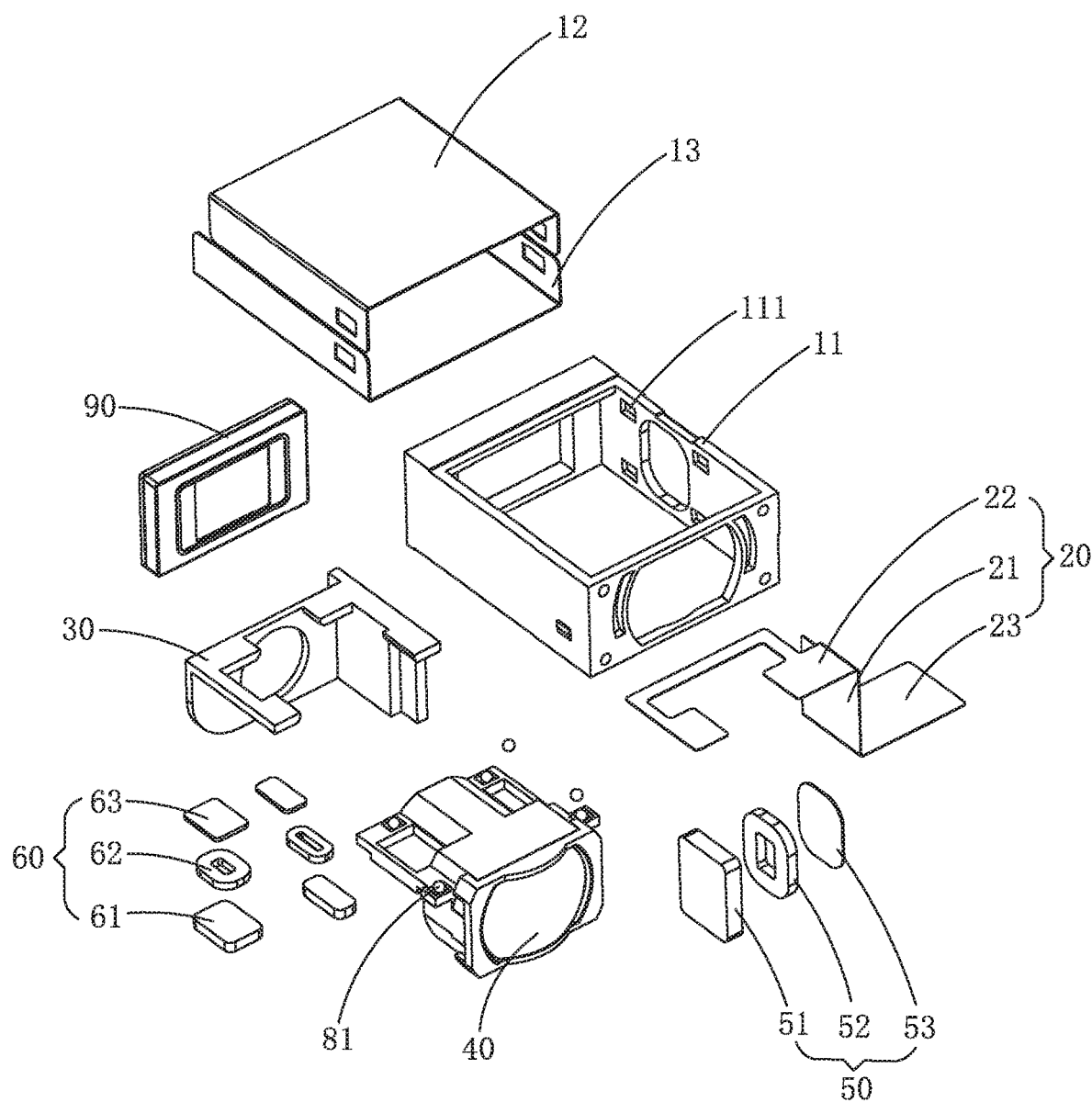
FIG. 2 is an exploded view of the camera lens module in FIG. 1.
Figure 8:
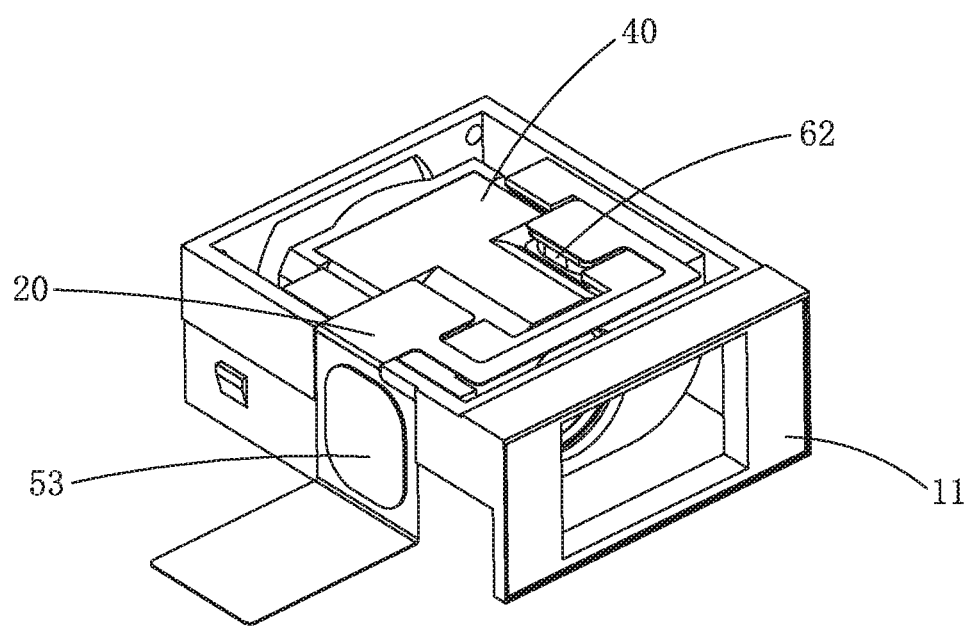
FIG. 8 is an isometric view of the camera lens module after removing a first covering plate, a second covering plate and an imaging sensor thereof.
Figure 9:
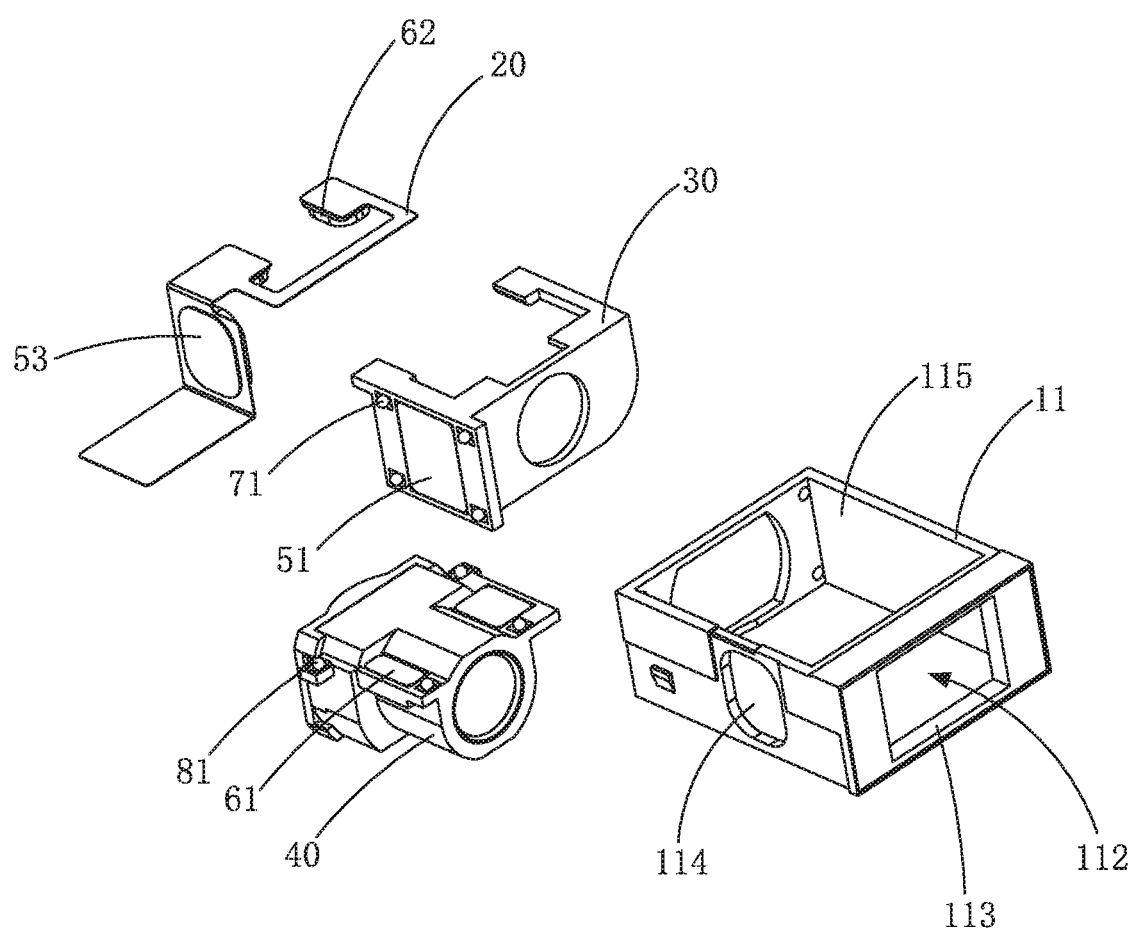
FIG. 9 is an exploded view of FIG. 8.

Please further refer to FIG. 2, FIGS. 8-9. Preferably, in this embodiment, the number of the first magnet 51 and the first driving coil 52 are both one. The first magnet 51 is installed on the first bracket 30 close to the first guide slip structure 70 In the middle of the outer side wall. The first driving coil 52 is provided on the housing 10 through the circuit board 20 and is spaced apart from the first magnet 51. The first driving coil 52 cooperates with the first magnet 51 in order to drive the lens assembly 40 to move more smoothly along the vertical optical axis.

The number of the second magnet 61 and the second driving coil 62 are both two. The two second magnet 61 are both installed on the top part of the lens assembly 40, and the two second driving coil 62 are both located on the housing 10 and are arranged opposite to the two second magnet 61 one by one. The two second driving coils 62 cooperate with the two second magnets 61 to drive the lens assembly 40 to move more smoothly along the vertical optical axis. In specific applications, the first magnet 51 and the first driving coil 52, the second magnet 61 and the second driving coil 62, the number and distribution are not limited to this.

Figure 10:
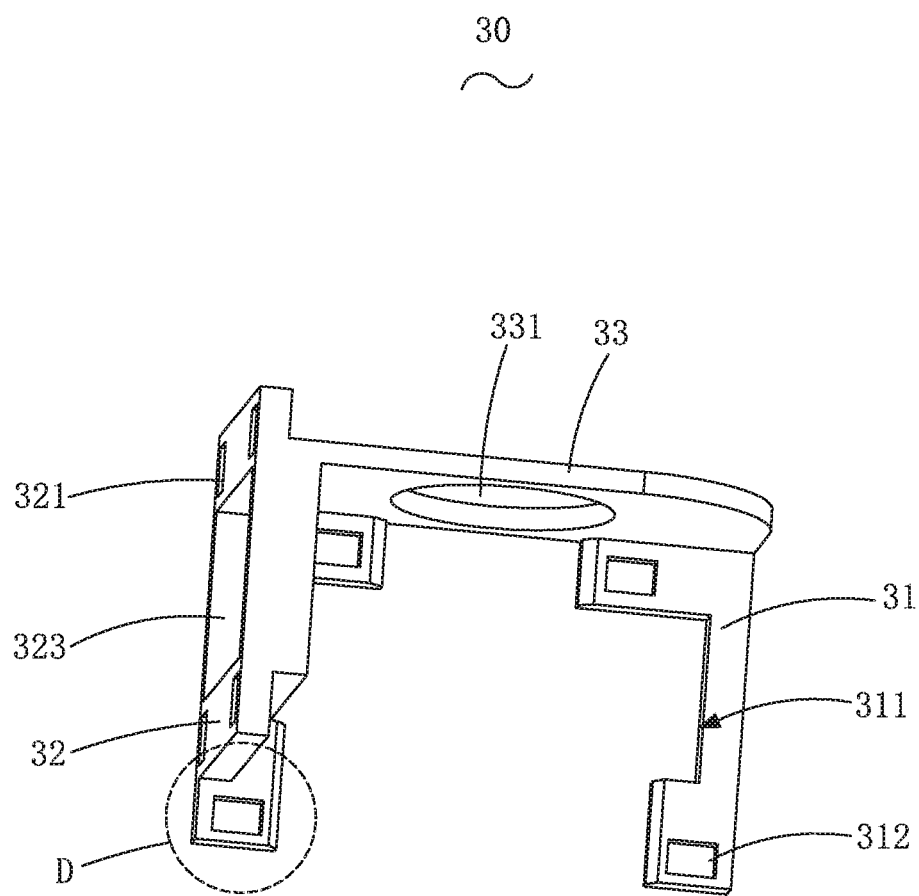
FIG. 10 is an isometric view of a first bracket of the camera lens module, from a first aspect.
Figure 11:
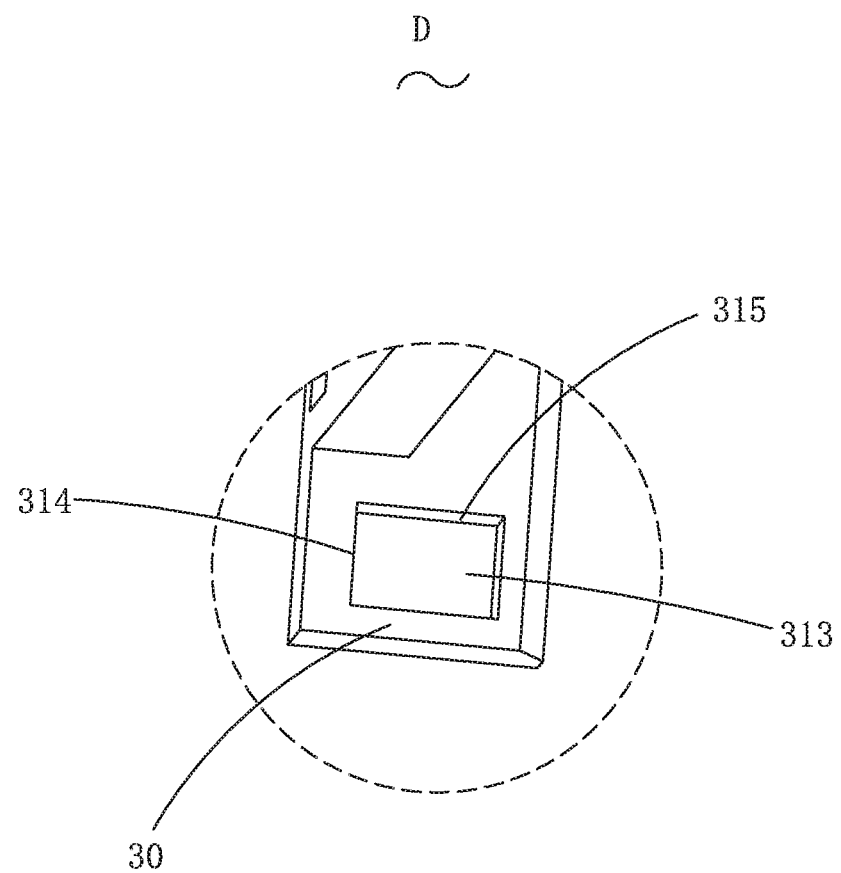
FIG. 11 is an enlarged view Part D in FIG. 10.
Figure 12:
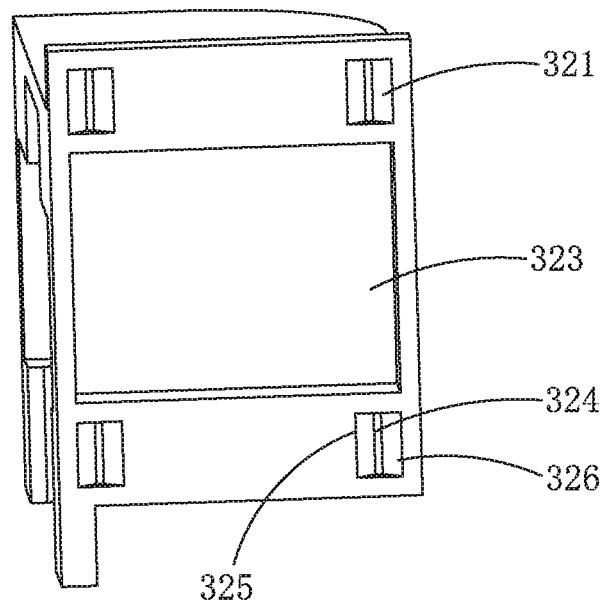
FIG. 12 is an isometric view of the first bracket from a second aspect.

Please refer to FIG. 10. The first bracket 30 includes a top plate 31, a side plate 32 extending vertically downward from one side of the top plate 31 and used to fix the first magnet 51 and end plates 33 connected to the top plate 31 and the side plate 32 on both sides respectively. The fourth chute 312 and the first avoidance opening 311 are set on the top plate 31 and The first chute 111 is set on the outer side of the side plate 32 so that the first chute 111 can be easily processed. A through hole 331 is opened on the end plate 33 for avoiding light from the lens assembly 40 to facilitate external light to enter the lens assembly 40 from the housing 10.

Figure 17:
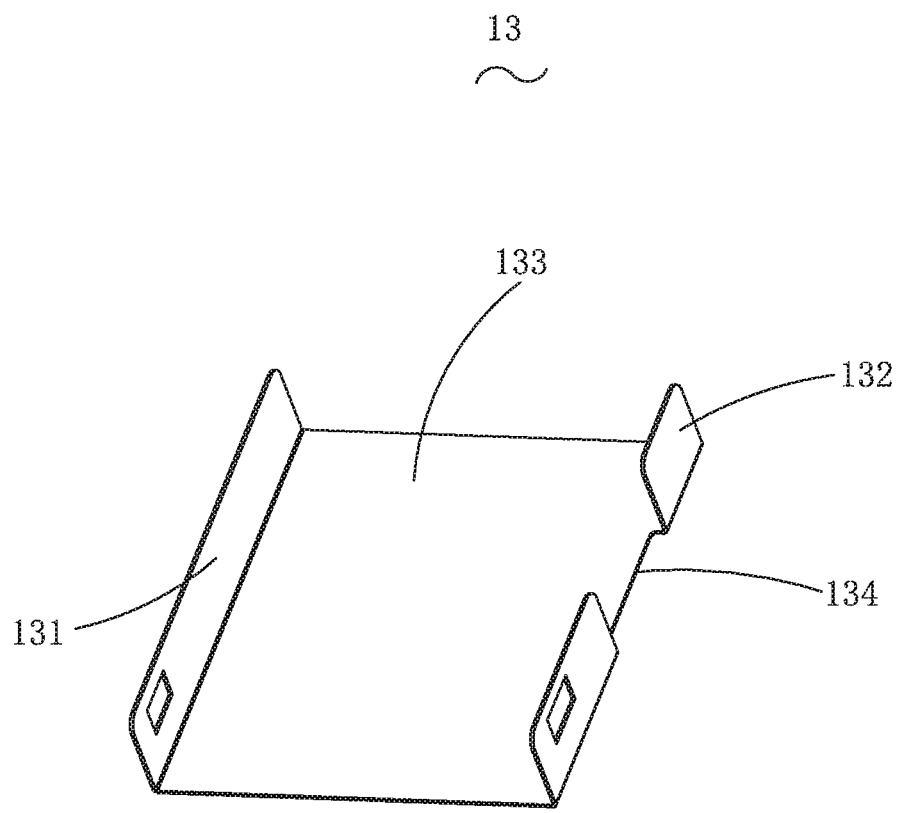
FIG. 17 is an isometric view of a second covering plate of the camera lens module.

Please refer to FIG. 2, FIG. 3 and FIG. 17, a camera lens module 1 also includes a imaging sensor 90, a housing 10 includes second bracket 11, a first covering plate 12 and a second covering plate 13. The first bracket 30, the lens assembly 40, the focus driving assembly 50 and the stability detection mechanism 60 are all located in the second bracket 11. The imaging sensor 90 can be detachably installed at the end part of the second bracket 11 near the lens assembly 40 image side. Both the first covering plate 12 and the second covering plate 13 have a first blocking plate 131 and a vertical spacing from the first blocking plate 131.

The second blocking plate 132 and the connection plate 133 provided between the first blocking plate 131 and the second blocking plate 132. The second blocking plate 132 is close to the side of the first pole plate 53. The first covering plate 12 is wrapped from the top part of the second bracket 11 to the outside of the end part on the second bracket 11 and covers one of the first pole plate 53. But without contacting the first bracket 30, the second covering plate 13 is wrapped from the bottom part of the second bracket 11 outside the lower end part of the second bracket 11, and the second blocking plate 132 of the second covering plate 13 is provided with a gap 134 for avoiding the circuit board 20, the first The covering plate 12 and the second covering plate 13 are enclosed with the second bracket 11 to form a third accommodation space for positioning the lens assembly 40 and the first bracket 30, and both the first covering plate 12 and the second covering plate 13 are fastened to the second bracket 11.

Figure 13:
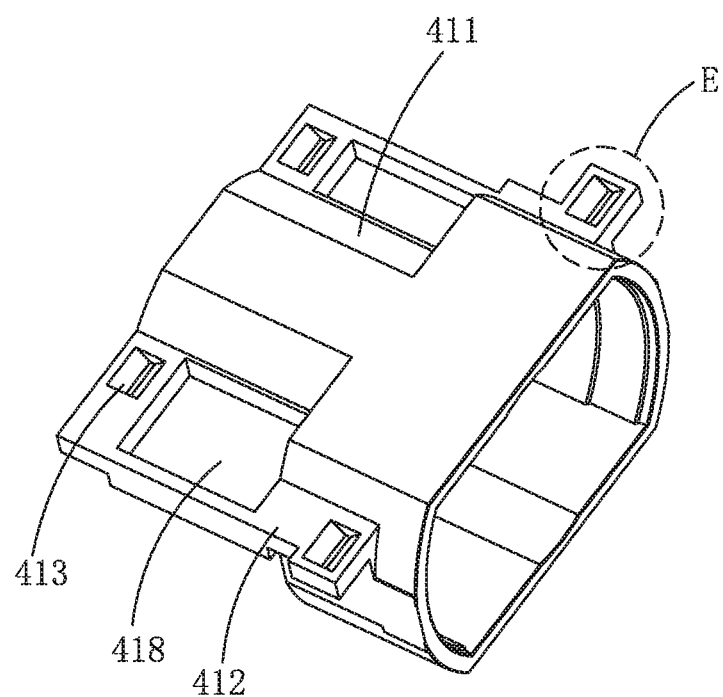
FIG. 13 is an isometric view of a lens barrel provided by the embodiment of the present invention.
Figure 14:
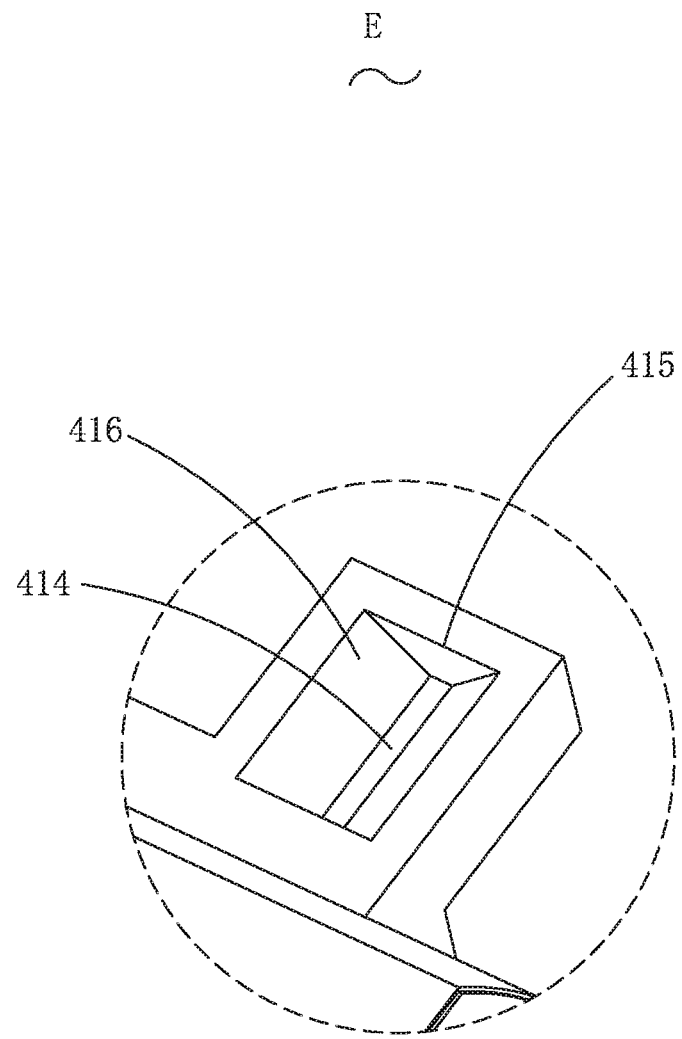
FIG. 14 is an enlarged structural view at E in FIG. 13.
Figure 15:
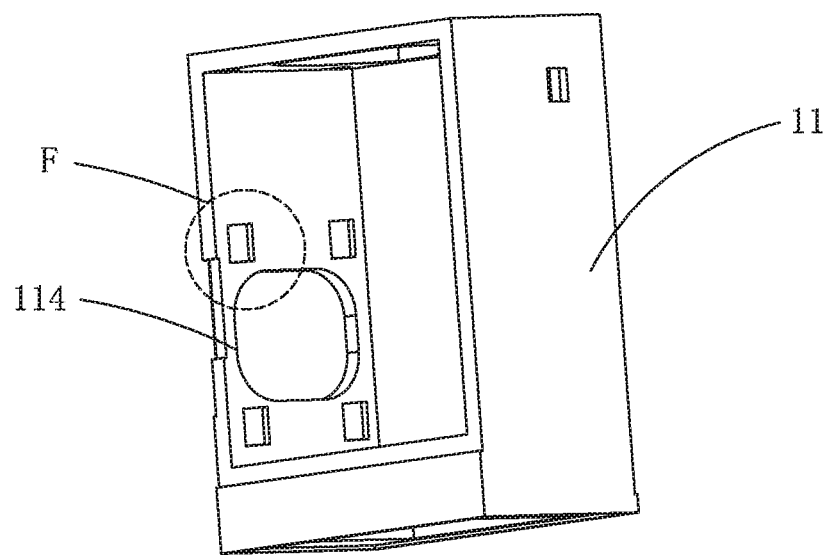
FIG. 15 is an isometric view of a second bracket of the camera lens module.
Figure 16:
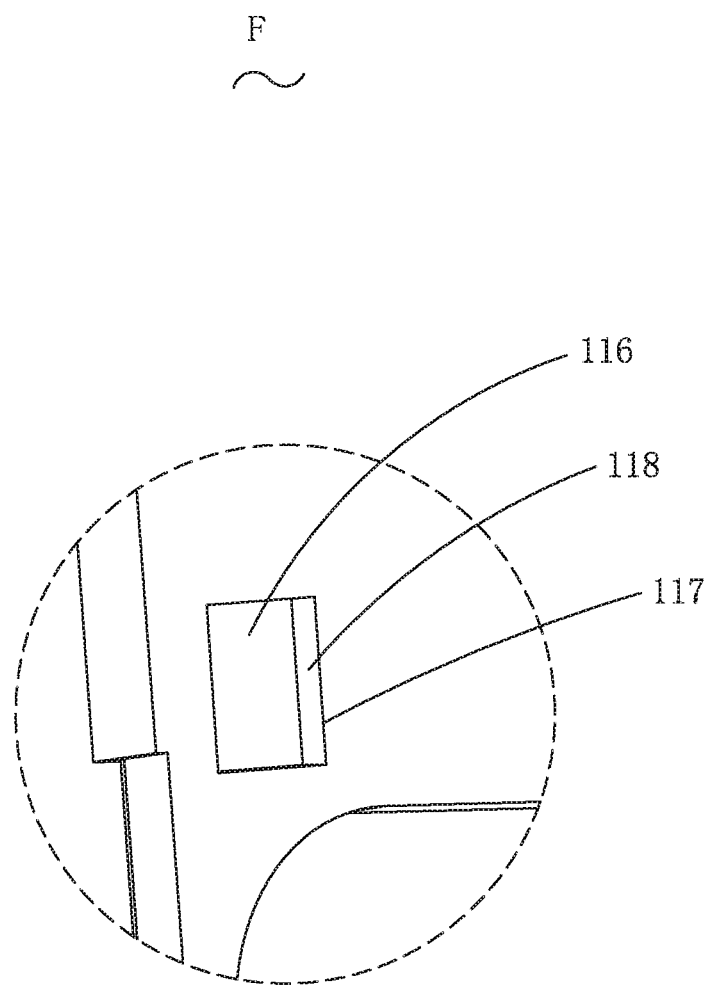
FIG. 16 is an enlarged view pf Part F in FIG. 15.

Please refer to FIG. 9 and FIG. 13. The second bracket 11 is provided with an inner cavity 112 for accommodating the first bracket 30 and the lens assembly 40, communicating with the inner cavity 112 for the light penetration hole 113 at one end of the lens assembly 40, and connected to the inner cavity 112 The through hole 114 is located at the side part of the second bracket 11 for the focus driving assembly 50 to pass through, and is connected to the inner cavity 112 and is located at the second bracket 11 top part for avoiding the second avoidance opening 115 of the stability detection mechanism 60. The first bracket 30 is correspondingly provided with a first accommodation slot 323 for fixing the first magnet 51. The lens assembly 40 includes a lens barrel 41 and a plurality of lens 42 disposed in the lens barrel 41.

The lens barrel 41 includes a cylindrical main body 411 and two convex parts 412. A plurality of lens 42 are located at In the cylindrical main body 411, two convex parts 412 are respectively arranged on both ends of the cylindrical main body 411 top part along the vertical optical axis, four third slip grooves 413 are equally distributed on the two convex part 412, and the two third slip grooves 413 on the same convex part 412 The axes are not on the same straight line. Two convex parts 412 are also provided with two second accommodation slots 418 for fixing the two second magnets 61 respectively. The second accommodation slots 418 are arranged between the two third slip grooves 413.

The first driving coil 52 in this embodiment is fixed on the circuit board 20 and cooperates with the first magnet 51 in the first accommodation slot 323 through the through hole 114 to generate a force for driving the lens assembly 40 and the first bracket 30 to move along the optical axis. The two driving coils 62 are fixed on the circuit board 20 and cooperate with the second magnet 61 in the second accommodation slot 418 through the second avoidance opening 115 and the first avoidance opening 311 to generate a force for driving the lens assembly 40 to move in a direction perpendicular to the optical axis.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens module comprises:
a housing;
a first bracket installed in the housing so as to be movable relative to the housing along an optical axis of the camera lens module;
a lens assembly mounted inside the first bracket in such a manner that the lens assembly is movable relative to the first bracket along the direction perpendicular to the optical axis direction and is immovable relative to the first bracket along the optical axis;
a focus driving assembly provided on the housing and the first bracket for driving the first bracket to drive the lens assembly to move along the optical axis of the lens assembly;

a stabilization detection mechanism coupled with the lens assembly and the housing for driving the lens assembly to move in a direction perpendicular to the optical axis;

a first guide slip structure for guiding the movement of the first bracket along the optical axis provided between the housing and the first bracket;

a second guide slip structure for guiding the lens assembly to move in a direction perpendicular to the optical axis provided between the housing and the lens assembly; and a first avoidance opening for avoiding the stability detection mechanism provided on the first bracket;

wherein the housing includes a second bracket, a first covering plate and a second covering plate; the first bracket, the lens assembly, the focus driving assembly and the stability detection mechanisms are all located in the second bracket the first covering plate and the second covering plate are wrapped on outside of the second bracket from the top part and the bottom part of the second bracket respectively.

2. The camera lens module as described in claim 1, wherein the focus driving assembly includes a first magnet provided in one side of the first bracket and one side of the housing and a first driving coil; the first driving coil is provided on the other side of the first bracket and the other side of the housing; the first driving coil is disposed opposite to the first magnet for driving the first bracket and the lens assembly to move along the optical axis in cooperation with the first magnet.

3. The camera lens module as described in claim 2, further comprising a first pole plate disposed on a side of the first driving coil away from the first magnet; the first pole plate is arranged opposite to the first magnet for attracting the first magnet to support the first bracket and the lens assembly.

4. The camera lens module as described in claim 3, wherein the first guide slip structure includes a plurality of first balls between a side of the housing and a first side part of the bracket, a plurality of first slip grooves in the side part of the housing and a plurality of second slip grooves in the first side part of bracket; the first slip groove and the second slip groove enclose for forming a first accommodation space for the first ball for providing movement guidance.

5. The camera lens module as described in claim 4, wherein the stabilization detection mechanism includes a second magnet on a top part of the lens assembly and a top part of the housing, and a second driving coil provided on another top part of the lens assembly and the top part of the housing; the second driving coil and the second magnet are spaced opposite apart for driving the lens assembly to move in the optical axis direction perpendicular to the lens assembly in cooperation with the second magnet.

6. The camera lens module as described in claim 5 further comprising a second pole plate disposed on the second driving coil on a side thereof away from the second magnet; the second pole plate and the second magnet are arranged opposite to each other at intervals for attracting the second magnet to support the lens assembly; and the second driving coil is provided between the second pole plate and the second magnet.

7. The camera lens module as described in claim 6, wherein the second guide slip structure includes a plurality of second balls provided between the top part of the lens assembly and the first bracket, a third slip groove provided on the top part of lens assembly and a plurality of fourth slip grooves provided on the first bracket; the third slip groove and the fourth slip groove are enclosed to form the second accommodation space for receiving the second balls for providing movement guidance.

8. The camera lens module as described in claim 7, further comprising a circuit board provided on the housing; the circuit board has a vertical plate vertically extending from one side of the housing and connected to the first drive coil, a lateral plate laterally extending from the top end of the vertical plate to the top part of the housing and connected to the second drive coil, and a extension plate laterally extending outside the housing from the bottom end of the vertical plate; or/and:

the first bracket includes a top plate, a side plate extending vertically downward from one side of the top plate and used for fixing the first magnet and a end plate respectively connected to the top plate and the side plate on both sides; the fourth slip groove and the first avoidance opening are provided on the top plate; the first slip groove is provided on an outer portion of the side plate, while the end plate is provided with a through hole for avoiding light entering the lens assembly.

9. The camera lens module as described in claim 1, wherein the second bracket includes an inner cavity for accommodating the first bracket and the lens assembly, an exposed light penetration hole connecting with the inner cavity, a through hole connecting with the inner cavity and located on the second side part of bracket for the focus driving assembly to pass through, and a second avoidance opening connecting with the inner cavity and located in top part of bracket for avoiding the stabilization detection mechanism.

* * * * *